United States Patent Office 3,213,609
Patented Oct. 26, 1965

3,213,609
HIGH ENERGY PROPELLANT AND PROCESS EMPLOYING HYDRAZINES AND NITRO COMPOUNDS
Howard Johnston, Concord, and Phyllis D. Oja, Walnut Creek, Calif., assignors to The Dow Chemical Company, Midland, Mich., a corporation of Delaware
No Drawing. Filed July 13, 1959, Ser. No. 826,448
9 Claims. (Cl. 60—35.4)

This invention relates to a high energy liquid propellant and to an improved method of increasing the thrust of a reaction type engine by employing the novel liquid propellant.

In a reaction type engine, a propellant is subjected to a thermochemical reaction, such as oxidation, in the combustion chamber of the engine generating reaction products at a high temperature and pressure which upon expansion through an exhaust nozzle imparts a reactive force or thrust to the engine. The propellants are the working substances of the engine. To develop high speeds and high thrusts with a reaction type engine high energy propellants are required.

Since the rocket engine does not depend upon the surrounding atmosphere to aid in the oxidation of the fuel, the propellant thus contains an oxidizable material or fuel and an oxidant necessary to effect the thermochemical reaction. The propellant may contain the oxidizing agent and the fuel in a single substance, such as a mixture, or be a substance containing these constituents chemically combined and requiring no auxiliary material to undergo the thermochemical reaction, such as nitromethane. The materials containing the fuel and the oxidant in a single substance or mixture or which require no auxiliary material to effect the reaction are referred to as "monopropellants." The oxidizer and the fuel may also be maintained as separated components and mixed only in the combustion chamber. When the oxidizer and the fuel are maintained as separated components, they are referred to as "bipropellants."

Due to simplification of equipment and operation, a liquid monopropellant would be an ideal source of energy for a rocket engine. For a liquid to be a satisfactory monopropellant, it must have a high energy content per pound upon decomposition. It must also be stable under storage and handling conditions and yet be readily ignitable and decompose completely upon injection into the combustion chamber. These requirements have not been satisfactorily met by the heretofore known monopropellants. The monopropellants which could be safely handled have had a relatively low energy content and those with a high energy level cannot be safely used due to their instability.

The employment of bipropellants has certain disadvantages. Separate storage, pumping, and metering devices must be provided for each of the materials. The duplication of the storage, pumping, and metering devices increases the weight of the system which reduces the maximum velocity obtainable with the engine by an extremely greater proportion. More undesirable, however, are the mechanical and operational difficulties encountered with the complex system necessary to pump and meter each of the materials into the combustion chamber at the desired rates and proportions. A slight malfunction results in complete failure of the engine.

It is, therefore, an object of this invention to provide a new high energy monopropellant. A further object is to provide a method of increasing the thrust of a rocket type engine by employing an improved high energy monopropellant.

The above and other objects are attained by providing a new high energy monopropellant comprising a mixture containing an oxidizer selected from the group consisting of dinitromethane and trinitromethane and a fuel selected from the group consisting of hydrazine, (2-propynyl) hydrazine and unsymmetrical-dimethylhydrazine. The new monopropellant is stable to physical shock and temperatures normally encountered in storage and handling. It is readily ignitable. Once ignited it oxidizes smoothly with a high energy release. Thus, the employment of the particular monopropellant having the favorable characteristics and high energy release upon decomposition provides a convenient method of increasing the thrust in a reaction type engine.

In preparation of the propellant, the oxidant may be simply dissolved in the fuel. This dissolution may be accomplished immediately before filling the propellant tank of the engine or it may be mixed beforehand in the desired proportions and stored and distributed as required. However, trinitromethane is sufficiently acidic so that when it is added to one of the fuels it forms an ionic salt. An exothermic reaction is obtained with sufficient heat being liberated to ignite the mixture if the addition of the oxidant is not carefully carried out. Thus, generally, it is preferred to react the trinitromethane with the fuel in an aqueous solution containing not more than 70 weight percent of the reactants. After the ionic salt is formed, the water is evaporated from the solution and the ionic salt remaining is then dissolved in the fuel in an amount to obtain the desired proportion of the trinitromethane in the propellant. Other additaments in minor proportion such as freezing point depressors may also be added.

The amount of the oxidant mixed with the fuel may be widely varied. The optimum proportions of each of the components in the composition will depend on a number of variables. These include the temperature at which the composition is to be handled prior to use, the completeness of combustion desired, the specific chemical composition of the fuel component and of the oxidizing agent, and the inherent solubility of the oxidizing component in the fuel component. Thus, the proportions may vary as widely as from about 55 percent by weight of the oxidizing agent in solution, such as when trinitromethane is dissolved in hydrazine, up to and including the proportion at which the solution is completely saturated with the oxidizing agent. Under certain conditions, this latter proportion may be as high as 80 percent by weight of the mixture. Normally, a somewhat narrower range of proportions is used, thus, from about 57 to about 70 percent by weight is advantageous. Usually sufficient amount of the oxidant is used to oxidize a major proportion of the fuel.

No special addition equipment has to be used in employing the monopropellant in a rocket engine. The propellant may be used in an engine adapted for high energy propellants using the known monopropellant type equipment and units. The monopropellant is injected into the combustion chamber by a pump through a metering device. Since only one fluid is charged, a relatively simple injection system may be employed. Upon injection into the combustion chamber, the propellant is ignited. Known ignition systems for rocket engines may be used. The propellant will spontaneously ignite when it is heated rapidly to a temperature of around 400° C. Thus, once the combustion in the combustion chamber has been started, the high temperature in the combustion chamber may be used to ignite the incoming propellant.

To further illustrate the invention the new monopropellants were made and tested.

The hydrazine salt of trinitromethane in an amount of 0.18 gram was dissolved in 0.06 gram of hydrazine. A yellow colored solution was obtained which was stable to mechanical shock. It was easily ignited on rapid heating to approximately 400° C. It burned very vigorously.

The term "rocket engine," as used herein, means a reaction type engine where the propellant supplied to the combustion chamber contains a fuel and an oxidizer or undergoes thermochemical reaction without the use of the surrounding atmosphere as an oxidant.

The term "decomposition," as used herein in reference to the propellant, means a thermochemical reaction which the propellant undergoes, resulting in a change in composition of the propellant, such as an oxidation reaction.

What is claimed is:

1. A high energy propellant consisting essentially of a solution containing a fuel selected from the group consisting of hydrazine, unsymmetrical-dimethylhydrazine, and 2-propynyl hydrazine and dissolved therein an oxidant selected from the group consisting of dinitromethane and trinitromethane in proportions sufficient at least to oxidize a major proportion of the fuel.

2. A propellant according to claim 1 wherein the fuel is hydrazine and the oxidant is trinitromethane.

3. A propellant according to claim 1 wherein the fuel is hydrazine and the oxidant is dinitromethane.

4. A propellant according to claim 1 wherein the fuel is unsymmetrical-dimethylhydrazine and the oxidant is trinitromethane.

5. A propellant according to claim 1 wherein the oxidant is dissolved in the fuel in proportion of from 57 weight percent to until the fuel is saturated with the oxidant.

6. A high energy propellant consisting essentially of a solution containing trinitromethane as an oxidant dissolved in hydrazine as a fuel in proportions of from 57 to 70 weight percent of trinitromethane.

7. In a method of obtaining thrust in a rocket engine wherein the thrust is obtained by the expansion of combustion products resulting from the combustion of a monopropellant in the combustion chamber of the engine, the improvement which comprises employing as a monopropellant a solution consisting essentially of a fuel selected from the group consisting of hydrazine, 2-propynyl hydrazine, and unsymmetrical-dimethylhydrazine and an oxidant, dissolved therein in proportion sufficient to oxidize major proportions of the fuel, selected from the group consisting of dinitromethane, and trinitromethane.

8. A method of obtaining thrust in a rocket type engine having a combustion chamber and an exhaust nozzle, which comprises injecting into the combustion chamber of the engine a monopropellant consisting essentially of a solution of unsymmetrical-dimethylhydrazine as a fuel and trinitromethane dissolved therein as an oxidant, in proportion of from 57 to 70 weight percent, igniting the monopropellant in the combustion chamber to decompose the monopropellant to obtain decomposition products at a high temperature and pressure, and discharging through the exhaust nozzle to impart a thrust to the engine.

9. A method of obtaining thrust in a rocket type engine having a combustion chamber and an exhaust nozzle, which comprises injecting into the combustion chamber of the engine a monopropellant consisting essentially of a solution of hydrazine as a fuel and trinitromethane dissolved therein as an oxidant, in proportion of from 57 to 70 weight percent, igniting the monopropellant in the combustion chamber to decompose the monopropellant to obtain decomposition products at a high temperature and pressure, and discharging the decomposition products from the combustion chamber through the exhaust nozzle to impart a thrust to the engine.

No references cited.

CARL D. QUARFORTH, *Primary Examiner.*
LEON D. ROSDOL, *Examiner.*